United States Patent [19]
Steier

[11] 3,895,533
[45] July 22, 1975

[54] SUCKING MEASURE

[76] Inventor: Moshe Steier, 67-66 108th St., Forest Hills, N.Y. 11375

[22] Filed: Nov. 14, 1973

[21] Appl. No.: 415,819

Related U.S. Application Data

[63] Substitute for Ser. No. 155,475, June 22, 1971, abandoned.

[52] U.S. Cl. .................................. 73/409; 128/2 R
[51] Int. Cl. .............................................. G01l 7/08
[58] Field of Search ...... 73/409; 128/208, 2 R, 252; 272/57 F; 215/11 A, 11 R

[56] References Cited
UNITED STATES PATENTS

| | | | |
|---|---|---|---|
| 821,664 | 5/1906 | Morris | 73/409 |
| 2,907,485 | 10/1959 | Lunden | 215/11 R |

Primary Examiner—Donald O. Woodiel
Attorney, Agent, or Firm—Carl Miller

[57] ABSTRACT

A device for measuring negative sucking pressure in infants, the device consisting of a baby bottle with a tight screw cap having a rubber nipple mounted thereupon, the nipple having a conventional small opening therethrough; there also being a hollow tube fitted eccentrically through the cap, the outer end of the tube being open while the inner end of the tube, located within the bottle, has a rubber balloon fitted thereupon, so that when the baby sucks on the nipple, a negative pressure is created in the bottle thus causing the balloon to expand, the size of which can be measured against a calibrated scale on the side of the bottle.

3 Claims, 3 Drawing Figures

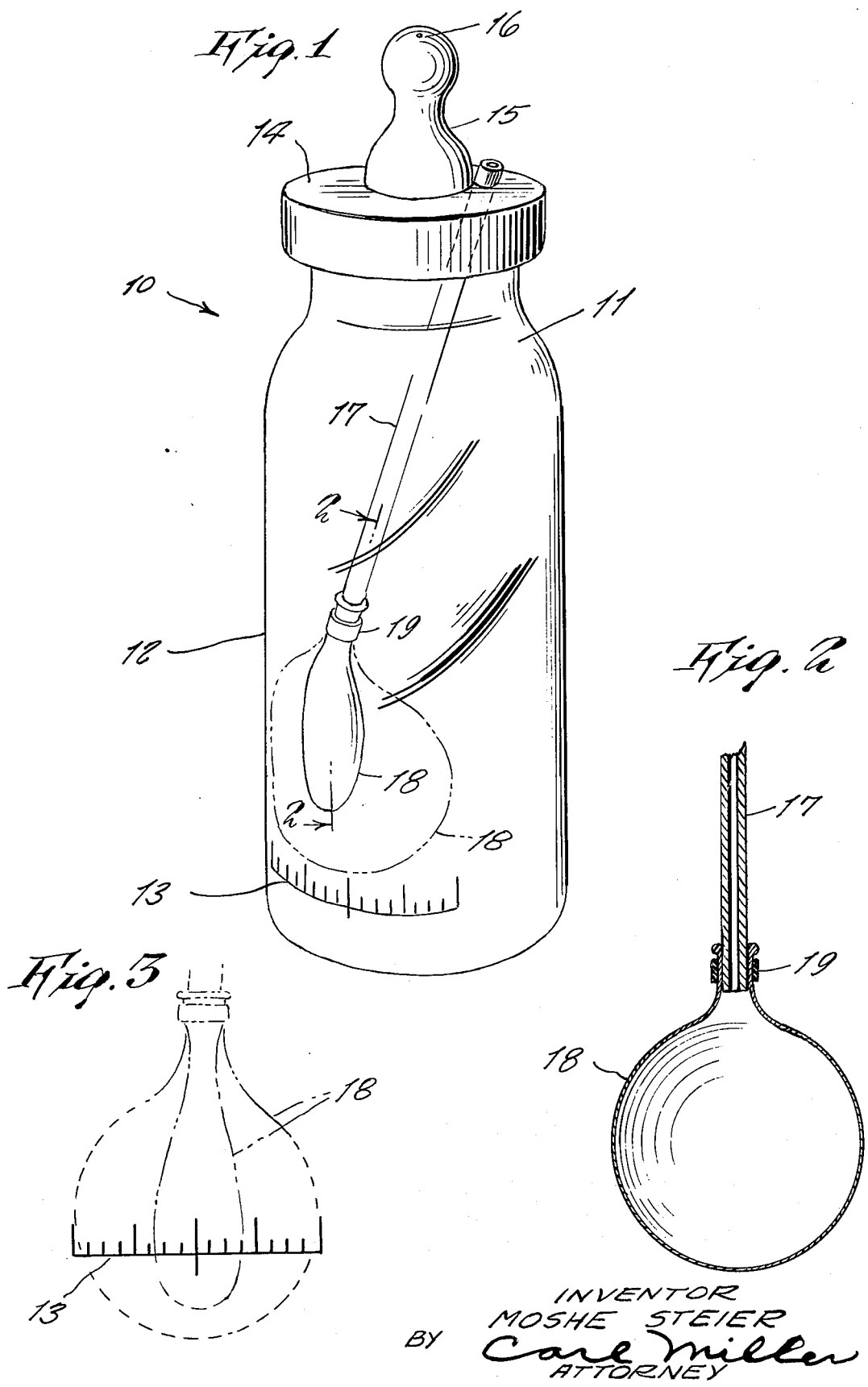

SUCKING MEASURE

This Application is a substitute Application for my Application now abandoned, Filed June 22, 1971, Ser. No. 155,475.

It is generally well known to those skilled in the art, that some infants have difficulty in sucking due to having a relatively poor sucking ability; and the extent of which is desirable to know so that the situation may be remidied or improved.

Accordingly, it is a principle object of the present invention to provide a measuring device whereby the negative sucking pressure of an infant may be taken by the attending pediatrician or the mother, so the steps can be taken to aid the baby.

Another object is to provide a sucking measure that can be visually observed.

Yet another object is to provide a sucking measure wherein the negative pressure quantity can be gauged against a calibrated scale so that changes in the infant's sucking pressure can be taken and recorded, if so needed.

Further objects of the invention will appear as the description proceeds.

To the accomplishment of the above and related objects, my invention may be embodied in the form illustrated in the accompanying drawings, attention being called to the fact, however, that the drawings are illustrative only, and that changes may be made in the specific construction illustrated and described within the scope of the appended claims.

FIG. 1 is a perspective view of the invention.

FIG. 2 is a cross sectional view on line 2—2 of FIG. 1.

FIG. 3 is a view of the balloon in various inflated conditions respective to a graduated scale of the bottle.

Referring now the drawings in detail, the reference numeral 10 represents a sucking measure according to the present invention wherein there is a baby bottle 11 of conventional appearance and shape, and which is of transparent material such as glass so to permit a person to see thereinto.

Upon a side 12 of the bottle there is engraved or die cast a calibrated scale 13 which may be measured from either end or from a center calibration to both sides.

Upon the top of the bottle, there is removable screw threaded cap 14 securable to a corresponding screw threaded neck around the bottle opening, the cap being made of hard plastic or other suitable material. A rubber nipple 15 is mounted upon the cap, the nipple having a conventional small opening like the one on conventional baby bottles.

A hollow tube 17 is eccentrically fitted through the cap 14, the outer end of the tube being left open, the inner end of the tube fitting into the bottle and having an inflatable rubber balloon 18 fitted thereupon, and secured by an elastic band 19. The tube extends angularly through the cap so that the balloon is positioned adjacent the calibrated scale 13.

In operative use, the bottle is presented to the infant for sucking. As the infant sucks, the pressure in the bottle decreases, and the balloon inflates; the size of the balloon being measurable against the calibrated scale.

While certain novel features of my invention have been shown and described and are pointed out in the annexed claims, it will be understood that various omissions, substitutions and changes in the forms, and details of the device illustrated and in its operation can be made by those skilled in the art without departing from the spirit of the invention.

Having thus described my invention what I claim as new and desire to secure by letters patent is:

1. In a sucking measure, for measuring the sucking power of an infant, the combination of a baby bottle, a removable cap upon said bottle, said cap having a rubber nipple upon a center thereof, said nipple having an opening therethrough providing an air communication with an interior of said bottle, said cap supporting means for measuring negative pressure within said bottle, said bottle having means for measuring a size of said supported means.

2. The combination as set forth in claim 1, wherein said supported means comprises a hollow-tube secured and extending through an eccentric portion of said cap, an outer end of said tube being open, and an inner end of said tube extending into said bottle interior and having an inflatable balloon fitted thereupon.

3. The combination as set forth in claim 2 wherein said size measuring means comprising said bottle being made of transparent glass, and a side of said bottle has a calibrated scale for measuring the inflated size of said balloon.

* * * * *